US007933991B2

(12) United States Patent
Ganesh et al.

(10) Patent No.: US 7,933,991 B2
(45) Date of Patent: Apr. 26, 2011

(54) PRESERVATION OF FILE LOCKS DURING CHECKPOINT AND RESTART OF A MOBILE SOFTWARE PARTITION

(75) Inventors: Perinkulam I. Ganesh, Round Rock, TX (US); Lance Warren Russell, Rosanky, TX (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 11/923,720

(22) Filed: Oct. 25, 2007

(65) Prior Publication Data

US 2009/0112965 A1 Apr. 30, 2009

(51) Int. Cl.
*G06F 15/173* (2006.01)
(52) U.S. Cl. ........ 709/225; 709/219; 707/609; 707/674; 707/690; 707/809; 707/827; 707/704; 707/821
(58) Field of Classification Search .......... 709/201–205, 709/208–216, 225–229, 248, 200; 707/609–612, 707/620–623, 633–639, 649, 674–678, 687–691, 707/703–704, 899, 821–828; 719/318–320
See application file for complete search history.

(56) References Cited

U.S. PATENT DOCUMENTS

| 5,367,698 | A | * | 11/1994 | Webber et al. | 709/203 |
| 5,596,754 | A | * | 1/1997 | Lomet | 710/200 |
| 5,845,082 | A | * | 12/1998 | Murakami | 709/226 |
| 5,913,213 | A | * | 6/1999 | Wikstrom et al. | 707/610 |
| 5,944,789 | A | * | 8/1999 | Tzelnic et al. | 709/214 |
| 5,956,718 | A | * | 9/1999 | Prasad et al. | 1/1 |
| 6,260,068 | B1 | * | 7/2001 | Zalewski et al. | 709/226 |
| 6,370,529 | B1 | * | 4/2002 | Kruglikov et al. | 707/704 |
| 6,377,958 | B1 | * | 4/2002 | Orcutt | 707/690 |
| 6,813,726 | B2 | * | 11/2004 | Dahlen et al. | 714/6 |
| 6,834,296 | B2 | | 12/2004 | Brown et al. | |
| 6,850,938 | B1 | * | 2/2005 | Sadjadi | 1/1 |
| 6,886,064 | B2 | * | 4/2005 | Dawkins et al. | 710/200 |
| 7,120,631 | B1 | * | 10/2006 | Vahalia et al. | 1/1 |

(Continued)

FOREIGN PATENT DOCUMENTS

FR 2872605 A1 1/2006
JP 3880528 11/2006

OTHER PUBLICATIONS

U.S. Appl. No. 11/564,316, filed Nov. 29, 2006, Craft et al.

(Continued)

*Primary Examiner* — Greg Bengzon
(74) *Attorney, Agent, or Firm* — Yee & Associates, P.C.; David A. Mims, Jr.

(57) ABSTRACT

A computer-implemented method, apparatus, and computer-usable program code for preserving file locks while moving a software partition from an origination network file system client data processing system to a destination network file system client data processing system is provided. A request for a file is received. A determination is made as to whether the request is for a file that is within a software partition. Responsive to a determination that the request is for a file within a software partition, a determination is made as to whether the request is a lock request. Responsive to a determination that the request is a lock request, a determination is made as to whether the software partition is being restarted. Responsive to a determination that the software partition is being restarted, the lock request is blocked from being sent to a remote network file system server.

20 Claims, 5 Drawing Sheets

U.S. PATENT DOCUMENTS

| | | | |
|---|---|---|---|
| 7,356,531 B1 * | 4/2008 | Popelka et al. | 1/1 |
| 7,457,880 B1 * | 11/2008 | Kim | 709/229 |
| 7,509,322 B2 * | 3/2009 | Miloushev et al. | 1/1 |
| 7,693,892 B2 * | 4/2010 | Koarashi | 707/704 |
| 7,720,796 B2 * | 5/2010 | Wong et al. | 707/639 |
| 2007/0244962 A1 * | 10/2007 | Laadan et al. | 709/201 |
| 2008/0172429 A1 * | 7/2008 | Lin et al. | 707/205 |
| 2008/0294773 A1 * | 11/2008 | Pafumi et al. | 709/225 |
| 2009/0007147 A1 * | 1/2009 | Craft et al. | 719/320 |

OTHER PUBLICATIONS

U.S. Appl. No. 11/741,500, filed Apr. 27, 2007, Craft et al.
U.S. Appl. No. 11/741,322, filed Apr. 27, 2007, Ganesh et al.
U.S. Appl. No. 11/241,528, filed Apr. 27, 2007, Craft et al.
U.S. Appl. No. 11/751,505, filed May 21, 2007, Craft et al.
U.S. Appl. No. 11/831,701, filed Jul. 31, 2007, Ganesh et al.
U.S. Appl. No. 11/867,303, filed Oct. 4, 2007, Craft et al.

* cited by examiner

PRESERVATION OF FILE LOCKS DURING CHECKPOINT AND RESTART OF A MOBILE SOFTWARE PARTITION

BACKGROUND OF THE INVENTION

1. Field of the Invention

The present invention relates generally to a data processing system. More particularly, the present invention is directed to a computer implemented method, apparatus, and computer-usable program code for preserving file locks while moving a software partition from one NFS client data processing system to a another NFS client data processing system.

2. Description of the Related Art

A workload partition (WPAR) is a software partition that provides isolation of software services, applications, and administration by utilizing flexible software-defined boundaries within a single instance of an operating system. This means each WPAR will run its own copy of user space programs but share the kernel (operating system) with the rest of the WPARs and the global operating system. User space is not part of a kernel. A software partition has the look and feel of a stand-alone system. The software partition can be booted, accessed, and shutdown like a stand-alone data processing system. Normally, for such partitions, the file system data is stored on the local hard disks.

For the sake of mobility of software partitions that can be checkpointed on one data processing system and restarted on another, the entire file system has to reside on a remote data processing system, such as, for example, on a network file system (NFS) server. A network file system is a type of file system. An NFS server is the data processing system, which holds the NFS files. The NFS files are accessed by NFS client, which is a data processing system that accesses the data stored on the NFS server. The NFS protocol is the protocol used by the NFS client and The NFS server to communicate. Checkpointing is a method for saving the state of a running process so that it may be restarted at a later time. To preserve data integrity, as a software partition is moved from one data processing system to another, the state of the file locks on the remote file system has to be moved as well. Currently, checkpointing the file lock information from a source data processing system and restoring the file lock information on a target data processing system is extremely complicated or even impossible.

SUMMARY OF THE INVENTION

The exemplary embodiments provide a computer-implemented method, apparatus, and computer-usable program code for preserving file locks while moving a software partition from an origination network file system client data processing system to a destination network file system client data processing system. A request for a file is received. A determination is made as to whether the request is for a file that is within a software partition. Responsive to a determination that the request is for a file within a software partition, a determination is made as to whether the request is a lock request. Responsive to a determination that the request is a lock request, a determination is made as to whether the software partition is being restarted. Responsive to a determination that the software partition is being restarted, the lock request is blocked from being sent to a remote network file system server.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
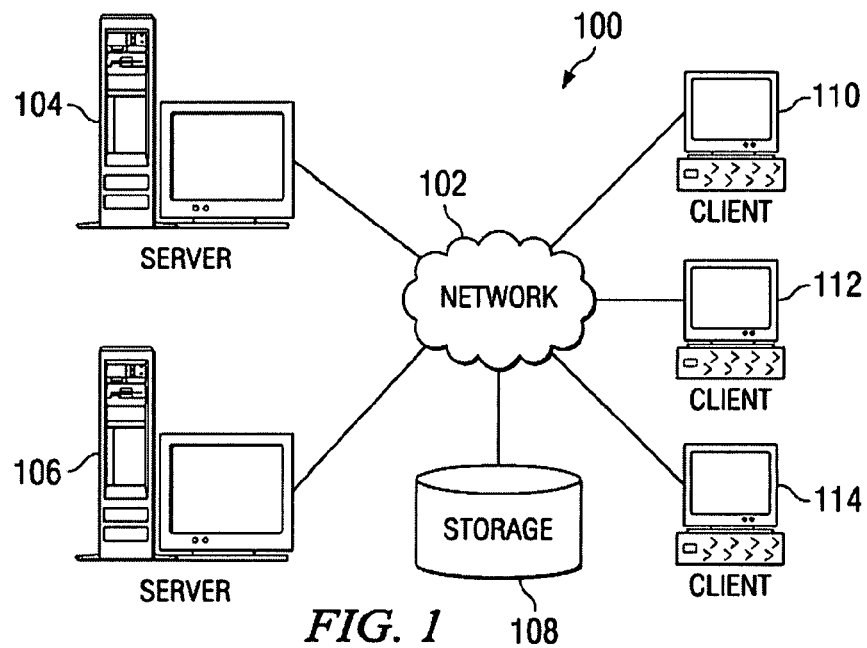
FIG. 1 depicts a pictorial representation of a network of data processing systems in which illustrative embodiments may be implemented.
Figure 2:
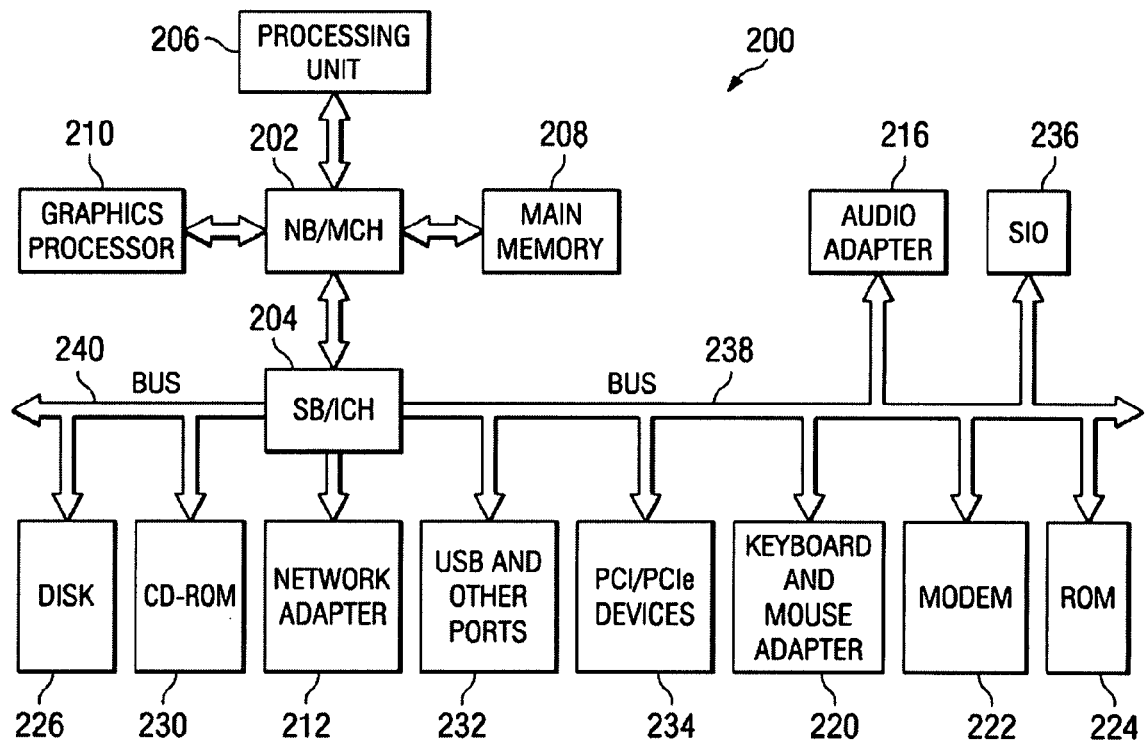
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including a north bridge and memory controller hub (NB/MCH) 202 and a south bridge and input/output (I/O) controller hub (SB/ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the NB/MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238, and hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Exemplary embodiments provide for checkpointing a software partition on a source data processing system and restarting the software partition on a remote destination data processing system. The software or workload partition (WPAR) boots from a remote file system, such as a NFS server. Checkpointing a mobile WPAR is therefore dependent on successful checkpointing of the remote file system.

NFS protocol has been implemented largely in a kernel, that is, inside the operating system, by most operating systems. The portion of NFS software implemented in the kernel is shared by the global operating system and the WPARs. There are some user space programs that implement the rest of the NFS protocol that is not implemented within the kernel. Examples of such user space programs are rpc.lockd and rpc.statd, which implement the file locking protocol. These programs are not shared with the global operating system and other WPARs. Rather, they are exclusive to each WPAR. During the checkpointing of either a version 2 or version 3 NFS client, exemplary embodiments preserve the NFS mounts internal to the WPAR, data, and file locks. Mounts are a collection of files. For example in FIG. 3 /foo, /bar, tmp, and /home, are called NFS mounts. This preserved state of the WPAR has to be recreated on a different data processing system. Since all the WPARS running on the same operating system of a data processing system share a common kernel portion of the NFS software, moving a WPAR should not affect the other ongoing NFS operations on the origination or destination data processing systems.

One of ordinary skill in the art would anticipate that moving a WPAR would involve checkpointing NFS kernel data structures, user data, and kernel processes, and moving the checkpointed data from the origination data processing system to the destination data processing system and repopulating the whole NFS protocol state inside the kernel without affecting other NFS protocol activities. This would be an extremely complicated operation.

Exemplary embodiments provide a unique way to checkpoint and to restart both a version 2 and version 3 NFS client from the user space using a user space checkpoint and restart program and with minimal changes to kernel code at generic locations and without disrupting the existing NFS protocol subsystem at the origination and destination data processing systems. Checkpointing and restarting the NFS protocol this way provides simplicity, system stability, and preserves data and file integrity. In addition, checkpointing and restarting in this unique way does not disrupt the NFS protocol thus making the checkpoint and restart of NFS protocol portable across other operating systems.

Exemplary embodiments utilize the statelessness of the NFS server side of NFS version 2 and version 3 protocol to move a WPAR from a origin data processing system to a destination data processing system. This movement is invisible to a user. Within a WPAR or any software partition, the process identifier (pid) is virtualized. During both the checkpoint and restart operations, processes and the network remain in a frozen state. Exemplary embodiments tunnel the frozen network for transmission of data operations. Tunneling means the transmission of data to specific ports on a destination data processing system through a blocked network.

A checkpoint program gathers the NFS protocol related mount information, including any necessary authentication and verification information, within the WPAR. The checkpoint program selectively unblocks and tunnels through the network, synchronizes the data to the remote NFS server and re-blocks the network. Later, the restart program restores the mount on the destination data processing system prior to the unfreezing of the processes and the network, by selectively tunneling through the network. Selectively tunneling means transmission of data to selective ports.

Checkpointing and restarting of an NFS protocol involves three operations. The operations are collecting and restoring the mount information and preserving the data and file locks. Exemplary embodiments provide for the collection and restoration of the mount information, as well as the preservation of the data, being implemented through the use of user space programs. Exemplary embodiments achieve file lock preservation by modifying the client side kernel component of the NFS protocol.

During normal lock operations, the lock request to the NFS server is presented with the network address of the WPAR and the virtualized pid of the WPAR, which serves as the system identification (sys_id). When the checkpoint operation completes the active processes inside the WPAR are terminated and the file descriptors associated with the files residing on the NFS server are closed by the topmost checkpoint program, which orchestrates the whole checkpoint operation. If a file lock has been held on a file, then file unlock requests for that file are sent to the NFS server prior to the closing of the file descriptor for the file. Since the file lock on the server needs to be preserved and still terminate the active processes, the file unlock requests, which are generated by the NFS client, are not transmitted to the remote NFS server.

Exemplary embodiments provide for the preservation of file locks during the checkpointing and restarting of a mobile software partition. In order to preserve the file locks during the checkpointing or restarting of a mobile WPAR, there are specific requirements. These requirements are: (1) none of the changes to the NFS code should break the interoperability of NFS protocol; (2) the IP address and hostname of the mobile WPAR remains the same; (3) the WPAR uses the WPAR's instance of status monitor protocol (rpc.statd) and lock protocol(rpc.lockd); (4) after restarting, the WPAR reconstructs the same lock structures for file lock/unlock requests as the WPAR had prior to checkpointing; and (5) the release of lock on the origination data processing system and the reacquiring of the lock on the destination data processing system is transparent to the NFS server. The rpc.lockd and rpc.statd reside within the WPAR itself as processes. A part of rpc.lockd is implemented within the operating system. Rpc.statd and rpc.lockd are programs that implement the file locking/unlocking protocol for NFS systems. The same programs reside on the NFS server and NFS client side. Based on the incoming request, the server side and client side functionality of file locking/unlocking are invoked.

If the first requirement is not met, the WPAR, which runs on the NFS client, would not be able to communicate with other NFS servers. As the NFS server identifies the NFS client using IP address and hostname, not meeting the second requirement prevents the NFS server from recognizing the NFS client. Fulfilling the third requirement ensures that the operations of other WPARs running on the same data processing system are not disrupted. If the fourth requirement is not met, a file lock request on a file issued prior to checkpointing cannot be unlocked after a restart if the structures are not identical.

The release of lock on the origination data processing system and the reacquiring of the lock on the destination data processing system need to be transparent to the NFS server. Otherwise, if the NFS server comes to know that a NFS client has an unlocked a file, the NFS server could grant access to the file to some other program running on another data processing system, thereby corrupting the file contents. Unlock requests are not passed to the NFS server during active process termination. Similarly, the lock request is replayed during restart on the NFS client. This replay creates locking information on the local system. However, the replayed lock request is not sent to the NFS server. In this way, file lock integrity remains preserved on the NFS server and processes can be terminated and restarted on NFS clients with no problem.

Exemplary embodiments ensure that none of the changes to the NFS code should break the interoperability of NFS protocol by making changes only to the client side code and by not making any changes to the NFS server code. The IP address and hostname of the mobile WPAR keeping the same is guaranteed by the WPAR mobility base design. However, this alone does not guarantee proper behavior. Recall, NFS protocol is largely implemented within the operating system and a common copy of the NFS protocol is shared between the global operating system and other WPARS. This sharing causes problem in AIX NFS code because the NFS kernel remote procedural call (RPC) code within the operating system may utilize a TCP connection opened by the global operating system or another WPAR to send the request. Packets sent over these connections would not contain the correct source address. Thus, in an exemplary embodiment, the RPC program is made WPAR aware. Therefore, the NFS server side RPC program will not collapse the connections. Since, locks are acquired in a process context, the RPC program on the NFS client side is capable of knowing who the requester is, as the WPAR identification can be obtained from the current process structure. The RPC program determines the correct IP address to use based on the WPAR id.

The changes specified above result in the NFS server viewing all WPAR locks as originating from a WPAR "node" and not globally from the data processing system. This forces compliance with the third condition, the condition that the WPAR use its own instance of status monitor protocol, the process rpc.statd, for lock recovery during a crash and its own instance lock protocol, the process rpc.lockd, for call back. Callback is a software concept where a first program, the NFS client in this case, registers a subroutine with a second program, the NFS server in this case, so that the second program can call back the first program to perform some selected task using the subroutine whenever needed.

Further, the locks must be recoverable in the event of a system crash. In order to accomplish this recovery, exemplary embodiments provide for rpc.statd program to be run in each WPAR. The rpc.statd program is aware that the program is running in a WPAR and interacts with only those NFS servers on which lock requests were issued with the WPAR's IP address. The rpc.statd program is a user level process that makes use of the /var/statmon directory to keep track of the server the program has locks on. Running multiple instances of the rpc.lockd program is possible because of the inherent design of WPARs. Each, WPAR runs in the WPAR's own chrooted file system and cannot see processes belonging to other WPARs or global processes. Chroot is a system call or API provided by the operating system. The purpose of a chroot system call is to change the root directory to the directory specified by the caller. Being chrooted disables the WPAR from viewing other file systems located above the chrooted location. Multiple instances of rpc.statd can therefore co-exist on the same system and each would have access to a /var/statmon directory that belongs to each rpc.statd program only.

The rpc.lockd program, on the other hand, is implemented mainly in the kernel. The rpc.lockd program creates a kernel process. The functionality of the kernel process is implemented mainly in the kernel. This causes problems, as multiple rpc.lockd programs cannot co-exist. To solve this problem, exemplary embodiments employ a custom rpc.lockd program, called a custom lockd, which was created specifically for WPARs. These lockd programs communicate with each other to preserve the file locks. The custom lockds register themselves with portmap like a normal rpc.lockd. However, whenever a custom lockd receives a call back from the NFS server, the custom lockd forwards the callback request to the rpc.lockd program of the global operating system on the same data processing system. The correct process is awoken in the kernel for lock acquisition. Similarly, any response from the global operating system's rpc.lockd program is received by the WPAR's custom lockd program and forwarded to the NFS server.

To accomplish the fourth condition, the condition that after the restart program the WPAR reconstructs the same lock structure as the WPAR had prior to acquiring the lock during the checking point process, the content of the nlm_lock structure are tied to the characteristics of the process acquiring the lock and not the characteristics of the mount. The characteristics of the nlm_lock are based on the WPAR to which the process acquiring the lock belongs rather than to the process that issued the mount operation to mount the file system from the NFS server.

NFS versions 2 and 3 are stateless and rely on a separate network lock manager (NLM) protocol to support locking of NFS-mounted files. For NFS version 3, NLM version 4 should also be supported. The NLM protocol in general defines the following structure, nlm_lock, for uniquely specifying a lock request to a NFS server:

```
struct nlm_lock {
    string    *caller_name
    netobj    fh;      /* identify a file */
    netobj    oh;      /* identify owner of a lock */
    integer   svid;    /* Unique process identifier */
    unsigned integer l__offset; /* File offset (for record locking) */
    unsigned integer l__len; /* Length (size of record) */
*/};
```

Note that none of the NLM information is tied to how the NFS mount was constructed. The "fh" is the file handle. The file handle is an opaque object constructed by the NFS server. An opaque object is an object that cannot be deciphered by the NFS client. The contents of the opaque object are meaningful to only the NFS server. On a NFS with an AIX operating system, the file handle is created using a major device number, the minor device number of the device on which the file resides, and an inode number of the file being locked.

The "caller_name" element of nlm_lock uniquely identifies the host making the lock call. AIX uses the system hostname. The "oh" field is an opaque object that identifies the host, or a process on the host, that is making the file lock/unlock request. On AIX, the opaque object is constructed through a combination of the pid of the WPAR and the hostname. The "svid" uniquely describes the process owning the file on the calling host. On AIX, the "svid" is the process identifier.

The lock request presented to the NFS server is created as follows. Since the hostname of a mobile WPAR does not change after restart, the "caller name" is set to the hostname of the WPAR of the calling process. The pid (process identifier) within a WPAR is virtualized, so that the processes look identical after a restart. The "svid" is set to the virtual pid of the calling process. During a call back from the NFS server, the virtual pid is converted back to the real pid within the NFS client code. As the "oh" field is constructed through a combination of the pid and the hostname, the required changes for "oh" are identical to those described for the "fh."

In an exemplary embodiment, the fifth condition, the condition of the release of lock on the origination side and the reacquiring of the lock on the destination data processing system, being transparent to the NFS server, is implemented as follows. When the checkpoint operation completes, the processes on the origination side have to be terminated and the associated file descriptors closed by the topmost checkpoint program, which orchestrates the whole checkpoint operation. Normally, when the file descriptor of a file with a file lock is closed, a file unlock request is transmitted to the NFS server. If the file unlock request is transmitted to the NFS server, then the NFS server would release the locks. In order to prevent the NFS server from releasing the locks, unlock requests are not transmitted to the NFS server.

The checkpoint program breaks the checkpoint into various states and posts a dynamic reconfiguration (DR) event for each state transition. The NFS client registers with the DR for these events. By registering with the DR, the NFS client is notified whenever there is a change of state. The NFS client can then take appropriate action. Thus, the NFS knows precisely when to turn off transmission of unlock requests to the NFS server.

On the destination data processing system, when a process is restored, files are reopened and lock requests are replayed by a topmost restart program, which orchestrates the whole restart operation. During this replay, local lock structures are recreated in the kernel. However, no lock requests are sent to the NFS server by the NFS client. The lock requests are blocked from reaching the NFS server until all the processes have been unfrozen.

Like the checkpoint process, the restart process also breaks the restart into various states and posts DR events. Thus, the NFS client on the destination data processing system knows how long to block lock requests from being transmitted to the NFS server. The lock information remains preserved on the NFS server during the checkpoint and restart of a WPAR. Thus, the relocation of the WPAR appears transparent to the NFS server.

Exemplary embodiments provide for collecting mount information. There are several ports that need to be tunneled on the origination data processing system side. These ports include the remote NFS server port, which is always port 2049, the remote NFS server portmap port, which is always port 111, and the local DNS port, which is usually port 53.

In an exemplary embodiment, the NFS checkpoint program is executed after the WPAR's network has been completely blocked and all the processes belonging to the WPAR on the origination data processing system have been frozen.

In an exemplary embodiment, the NFS checkpoint program is executed in user space and performs several tasks. Running the checkpoint program as a user space application is much safer as a user space application cannot crash a system. The NFS checkpoint program "Brands" itself as a WPAR process so that the NFS checkpoint program may view only those mounts that were issued within the WPAR. Brando is a system call provided by the WPAR frame work to incorporate a global process into a WPAR.

The NFS checkpoint program collects information about all of the mounts internal to the WPAR. The NFS checkpoint program determines if any type of authentication information, such as Kerberos authentication, for example, is being used in any of the mounts. A note regarding the use of authentication information is made and kept in the checkpoint file. All the mount details are collected and saved in the checkpoint file, as well. The DNS port, usually port 53, is unblocked. For each mount, the NFS checkpoint program unblocks the connection to the NFS server port, port 2049, and the portmap port, port 111, on the NFS server. All the data remaining on the NFS client is saved, or flushed, on the NFS server. Synchronization, or the flushing operation, by default, does not wait for the flush to complete and does not return a code to the calling operation. Without a return code, it is hard to ascertain if the data has been flushed. Further, blindly flushing all data on a system wide basis is inefficient. So, a per VFS (Virtual File System) or per mounted file system synchronization routine, which synchronizes data per mount point and returns a return code, was implemented.

After synchronizing the data for the mount, the NFS server port and the portmap port on the NFS server are reblocked. Since the processes pertaining to the WPAR being checkpointed are frozen, no process initiated network activity occurs during the synchronizing through the NFS server port and the portmap port on the NFS server.

Then the checkpoint program blocks the DNS port. When the checkpoint program completes, processes are terminated, their associated file descriptors are closed, and file lock structures are freed. However, none of the unlock requests are transmitted to the NFS server.

In an exemplary embodiment, on the destination data processing system, when a process is restored, lock requests are replayed. Replaying means the locks are acquired again. During this replay, local lock structures are recreated in the kernel but no lock requests are sent to the remote NFS server. All lock requests are blocked from reaching the remote NFS server until all the processes have been unfrozen. Restoring a process means recreating the image of the process on the destination data processing system. Unfreezing means allowing the process to run or execute. The status monitor protocol is restarted on the destination data processing system. However, the status monitor does not send notification of its restart to the remote status monitor running on the NFS server. This is because if a restart notification regarding the status monitor is received by the NFS server, the NFS server would understand the notification as an indication that the NFS client had gone down and the NFS server would start the NFS lock recovery protocol on the NFS client. This is not a desired operation. The lock information remains preserved on the NFS server side. The relocation of the WPAR thus appears transparent to the remote NPS server.

On the destination data processing system, several ports need to be tunneled during the restart process. These ports include the local portmap port, which is always port 111, the remote Kerberos Key Distribution Center (KDC) server port, in case Kerberos authentication is enabled, the remote NPS server portmap port, which is always port 111, and the remote mounts port, which is not a fixed port.

In an exemplary embodiment, the NFS restart program executes, with the checkpoint file name, which was created by the NFS checkpoint process earlier, and the WPAR name as an argument for the restart program. In an exemplary embodiment, the WPAR mount mounted from the global operating system, which are mount like /var, /etc, /tmp, /usr, and so on, for example, are mounted prior to executing the NFS restart program by a global restart program, which also executes the NFS restart program at the appropriate time.

In an exemplary embodiment, the NFS restart program performs several functions. The NFS restart program reads the checkpoint file. The NFS restart program also reads the authentication information.

If Kerberos authentication is needed, a transient portmap process is started. A transient portmap is a portmap process that is created for a short duration and killed prior to exit of the NFS restart process. Then the NFS restart program unblocks the local portmap port. A transient general security services daemon (gssd) is started. A daemon is a process, which runs continuously on a system for handling requests. The transient gssd may have to talk to the KDC server, so the port to the KDC server, which is usually port 88, and the DNS port, which is usually port 53, are opened up.

Each individual mount entry from the checkpoint file is read. The connections to the NFS server's portmap and rpc.mountd ports, which are listed in the mount entry, are unblocked. Rpc.mountd is a daemon, which runs on the NFS server and handles NFS mount requests. The NFS restart program brands into the WPAR and executes the mount for the mount entry. Then the portmap and rpc.mountd ports are blocked. At the end, if the transient gssd and portmap were started then they are stopped and their ports are blocked. Then the KDC server port is blocked and the DNS port is blocked.

In an exemplary embodiment, a global restart program replays open on all the files on behalf of the frozen processes and associates the frozen processes with the file descriptors. The global restart program also replays the lock requests. During this replay, local lock structures are recreated in the kernel. However, no lock requests are sent to the NFS server. The lock requests are blocked from reaching the server until all the processes have been unfrozen. Finally, the global restart program unblocks the network and the frozen processes are unfrozen. The whole movement of the WPAR remains transparent to the NFS server.

Future crash recovery is possible as the name of the list of servers on which the mobile WPAR has locks that are maintained under a specific directory. This directory is the /var/statmon/sm directory. The directory is stored at a remote file system and gets remounted on the destination.

Figure 3:
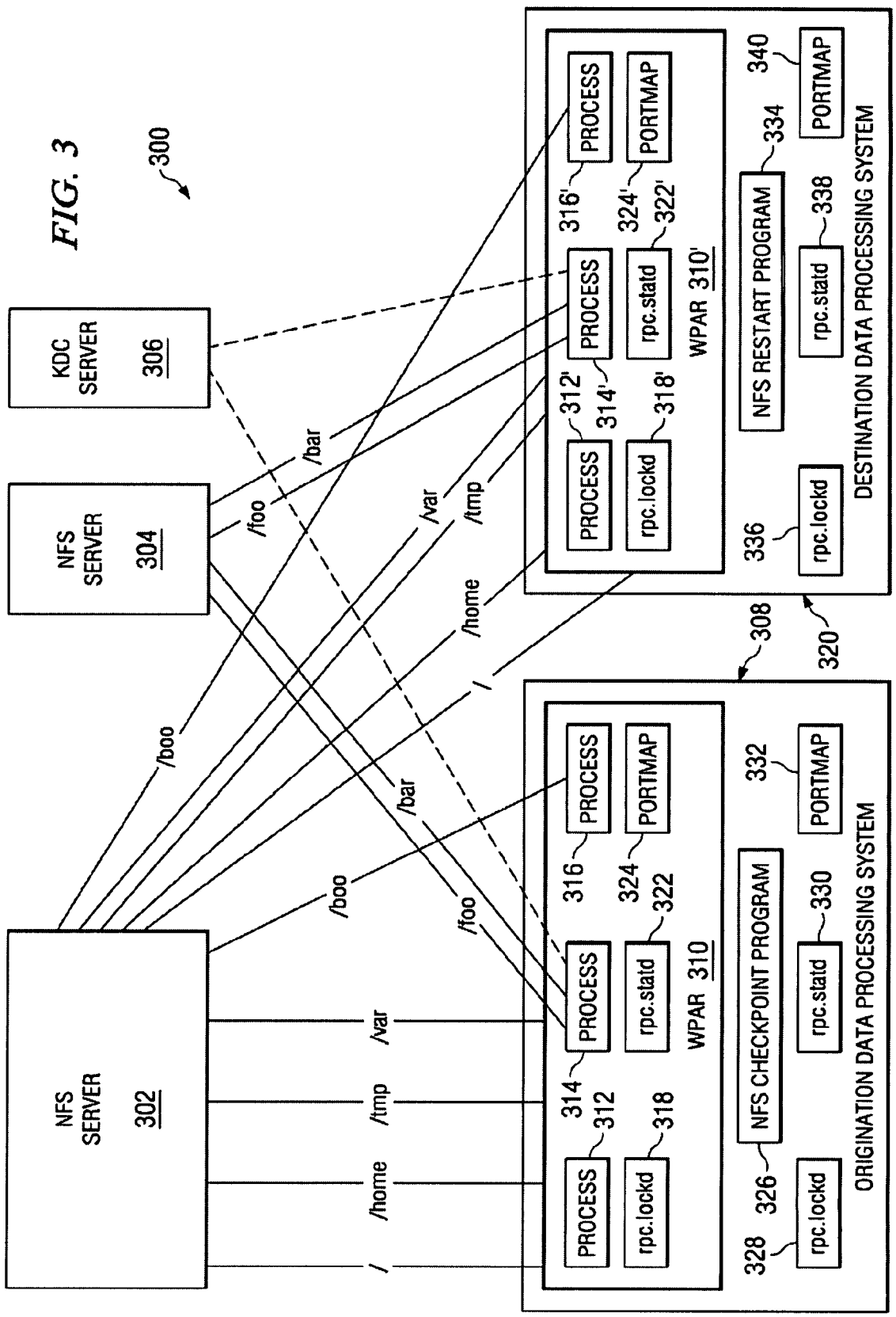
FIG. 3 is a block diagram illustrating a system for moving a software partition from one NFS client data processing system to another NFS client data processing system and for preserving file locks while moving a software partition from one NFS client data processing system to another NFS client data processing system, in accordance with an exemplary embodiment.

Turning back to the figures, FIG. 3 is a block diagram illustrating a system for moving a software partition from one NFS client data processing system to another NFS client data processing system and for preserving file locks while moving a software partition from one NFS client data processing system to another NFS client data processing system, in accordance with an exemplary embodiment. System 300 comprises NFS servers 302 and 304, KDC server 306, origination data processing system 308 and destination data processing system 320. NFS servers 302 and 304, KDC server 306, origination data processing system 308 and destination data processing system 320 may each be implemented as a data processing system, such as data processing system 200 of FIG. 2, or in a network, such as network 100 of FIG. 1. NFS server 304 is a server that requires authentication. KDC server 306 is the server that handles authentication for NFS server 304. It should be understood that the three servers that are depicted in FIG. 3 are for explanation purposes only. In alternate embodiments system 300 could be comprised of any number of servers from one to several. Furthermore, while the software partition WPAR 310 is illustrated with three (3) processes, a software partition could have any number of processes from one to several.

Origination data processing system 308 shows a software partition, WPAR 310, with three processes, processes 312, 314, and 316, as well as rpc.lockd 318, rpc.statd 322 and portmap 324. Rpc.lockd 318 and rpc.statd 322 are WPAR 310's instances of the lock protocol and the status monitor protocol. Portmap 324 is WPAR 310's instance of the portmap. Portmap is a daemon, which provides the port number or RPC programs. RPC programs register their port number with portmap when they start up. That is how portmap knows their port number. Processes 312, 314, and 316 are interfaces that access files stored on NFS servers 302 and 304. As depicted NFS server 302 has four mounts, mounts /, /tmp, /home and /var that connects to the software partition, WPAR 310. WPAR 310 has one (1) mount, mount /boo, specifically used by process 316 mounted from NFS server 302. WPAR 310 has two (2) mounts, mounts /foo and /bar, that are used by process 314 mounted from NFS server 304. As NFS server 304 is a server that requires Kerberos authentication, KDC server 306 performs authentication for NFS server 304, as indicated by the dotted line between process 314 and KDC server 306.

Origination data processing system 308 also comprises NFS checkpoint program 326, rpc.lockd 328, rpc.statd 330 and portmap 332, all of which belong to the global operating system of origination data processing system 308.

Destination data processing system 320 shows WPAR 310 after the software partition has been moved to destination data processing system 320, forming WPAR 310I. WPAR 310' comprises three processes, process 312', 314' and 316', which are processes 312, 314 and 316 after they have been moved to and reside on destination data processing system 320, as well as rpc.lockd 318', rpc.statd 322', and portmap 324' which are rpc.lockd 318, rpc.statd 322, and portmap 324 after they have been moved to and reside on destination data processing system 320.

As can bee seen, WPAR 310' has the same mounts to NFS server 302, mounts /, /home, /tmp, /var, and /boo, that WPAR 310 had when WPAR 310' resided on origination data processing system 308. These mounts maintain the same connection relationship to WPAR 310' that the mounts had with WPAR 310. The same is true for the mounts from NFS server 302 and 304.

Destination data processing system 320 also comprises NFS restart program 334, rpc.lockd 336, rpc.statd 338 and portmap 340, all of which belong to the global operating system of destination data processing system 320.

Thus, when WPAR 310 is moved from origination data processing system 308 to destination data processing system 320, the same mounts and mount relationships are recreated with NFS servers 302 and 304. Therefore, to the NFS servers and to the users of the software partition, the software partition appears to be the same software partition as before and the NFS server and the users are unaware of the fact that the software partition has been moved.

A file lock/unlock request is a subroutine, a system call to be more precise. As an example of the operation of system 300, consider the case wherein a program on the origination data processing system, which is a NFS client, opens a file. The file resides on the remote NFS server. Note the program runs on top of the operating system so an open subroutine is handled internally by the operating system (OS). NFS code is a part of the operating system. When the OS recognizes that the file is a NFS file, the operating system lets the NFS protocol handle the opening of the file.

The NFS client sends the request to the NFS server. The NFS server passes back a handle to the NFS client. The program uses this handle for future file operations. Next, the program makes a file lock request. Like an open request, a file lock/unlock request is a subroutine. This subroutine is handled internally by the OS and passed to the NFS client. The NFS client sends the request to the NFS server. The server locks the file. The program writes data to the file. The NFS client sends the data to the NFS server. The program now unlocks the file. The unlock request is handled by NFS client, in kernel. The request is sent to the NFS server. The NFS server unlocks the file. The program now closes the file. The OS lets the NFS client handle the close request. The close request is sent to the NFS server. The program now exits.

Figure 4:
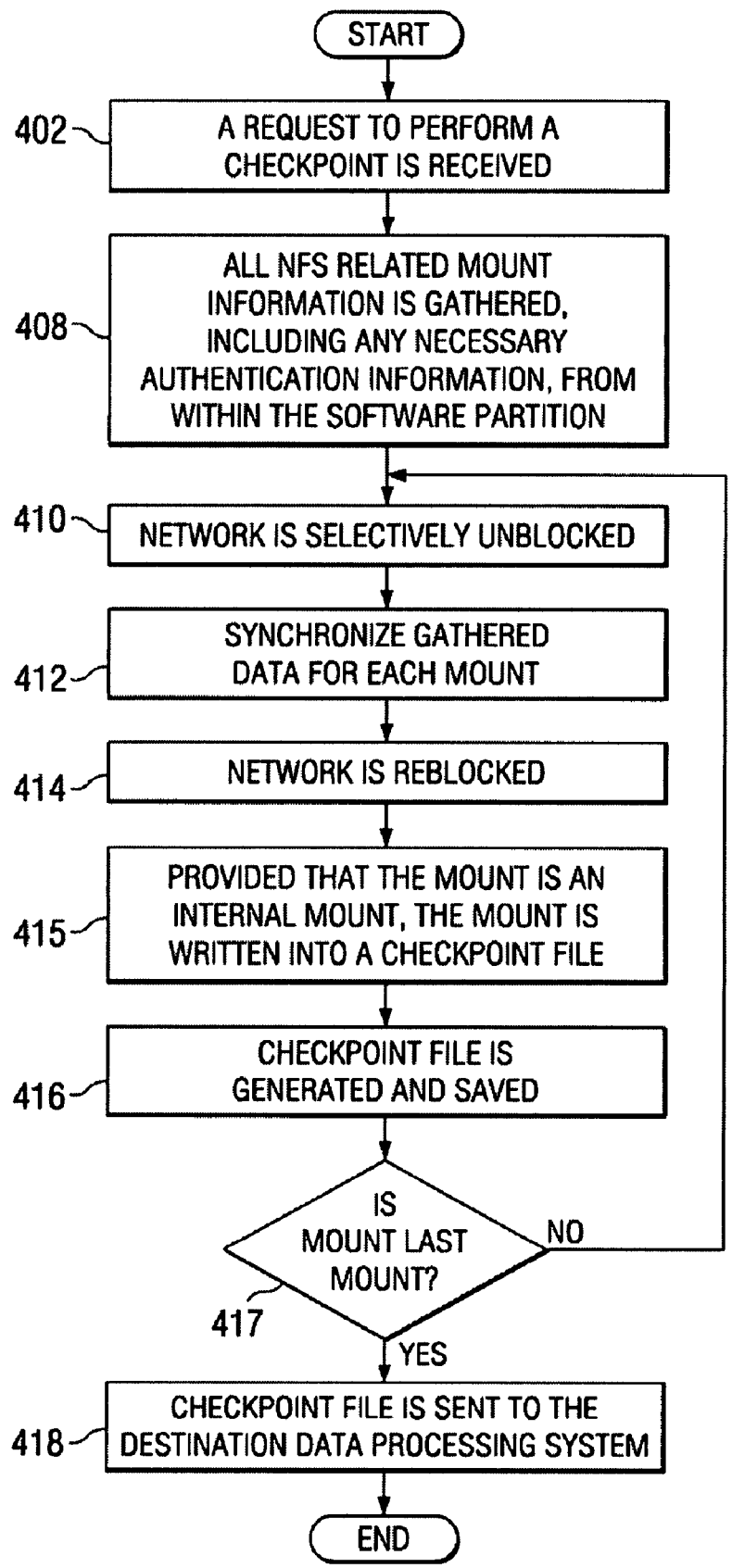
FIG. 4 is a flowchart illustrating the operation of a NFS checkpoint program, in accordance with an exemplary embodiment.

FIG. 4 is a flowchart illustrating the operation of a NFS checkpoint program, in accordance with an exemplary embodiment. The operation of FIG. 4 may be implemented in a data processing system such as origination data processing system 308 in FIG. 3. Specifically, the operation of FIG. 4 may be performed by NFS checkpoint program, such as NFS checkpoint program 326 of FIG. 3. The operation begins when a request to perform a checkpoint is received (step 402).

All NFS related mount information is gathered, including any necessary authentication information, from within the software partition (step 408). The network is selectively unblocked (step 410). Selectively unblocked means that specific, determined ports are unblocked, rather than unblocking the entire network. The gathered data for each mount is synchronized with the remote NFS server (step 412) by tunneling. The network is re-blocked (step 414). Provided that the mount is an internal mount, the mount is written into a checkpoint file (step 415). The checkpoint file is saved (step 416). A determination is made as to whether the mount is the last mount (step 417). If the mount is determined not to be the last mount (a no output to step 417), the operation returns to step 410. If the mount is determined to be the last mount (a yes output to step 417), the checkpoint file is sent to the destination data processing system (step 418) and the process ends.

Figure 5:
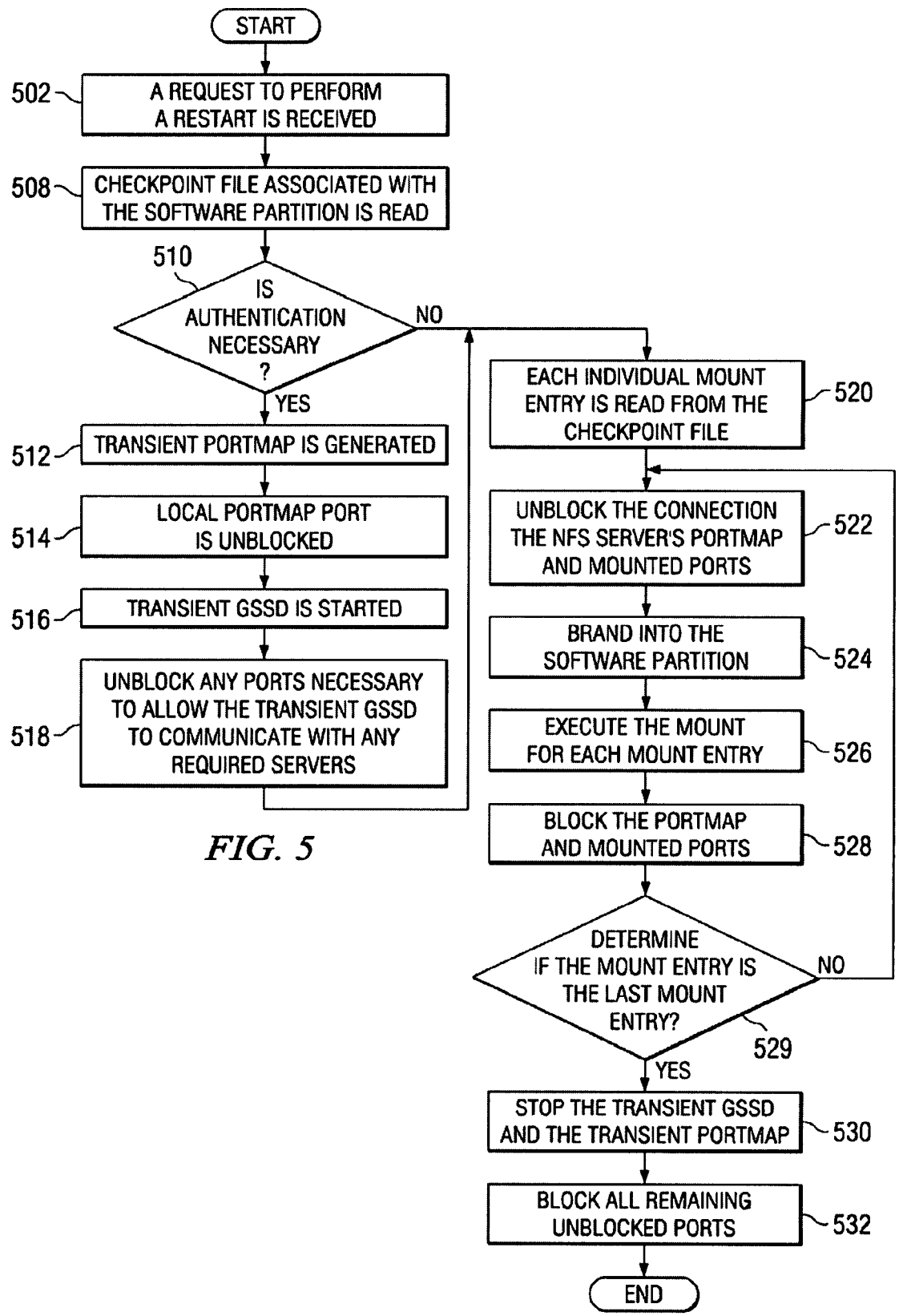
FIG. 5 is a flowchart illustrating the operation of a NFS restart program, in accordance with an exemplary embodiment.

FIG. 5 is a flowchart illustrating the operation of a NFS restart program, in accordance with an exemplary embodiment. The operation of FIG. 5 may be implemented by a data processing system such as destination data processing system 320 in FIG. 3. Specifically, the operation of FIG. 5 may be performed by NFS restart program 334 of FIG. 3. The operation begins when a request to perform a restart is received (step 502).

A checkpoint file associated with the software partition is read (step 508). The operation determines if authentication is necessary (step 510). If authentication is necessary (a "yes" output to step 510), a transient portmap is generated (step 512). The local portmap port is unblocked (step 514). A transient gssd is started (step 516). Unblock any ports necessary to allow the transient gssd to communicate with any required servers (step 518) such as a Kerberos KDC server and DNS server, and proceed to step 520.

If authentication is not necessary (a "no" output to step 510), each individual mount entry is read from the checkpoint file (step 520). Unblock the connection to the NFS server's portmap and rpc.mountd ports (step 522). Brand into the software partition (step 524). Execute the mount for each mount entry (step 526). Block the portmap and rpc.mountd ports (step 528). Determine if the mount entry is the last mount entry (step 529). If the mount entry is not the last mount entry (a "no" output to step 529), return to step 522. If the mount entry is the last mount entry (a "yes" output to step 529), stop the transient gssd and the transient portmap (step 530). Block all remaining unblocked ports (step 532) and the operation ends.

Figure 6:
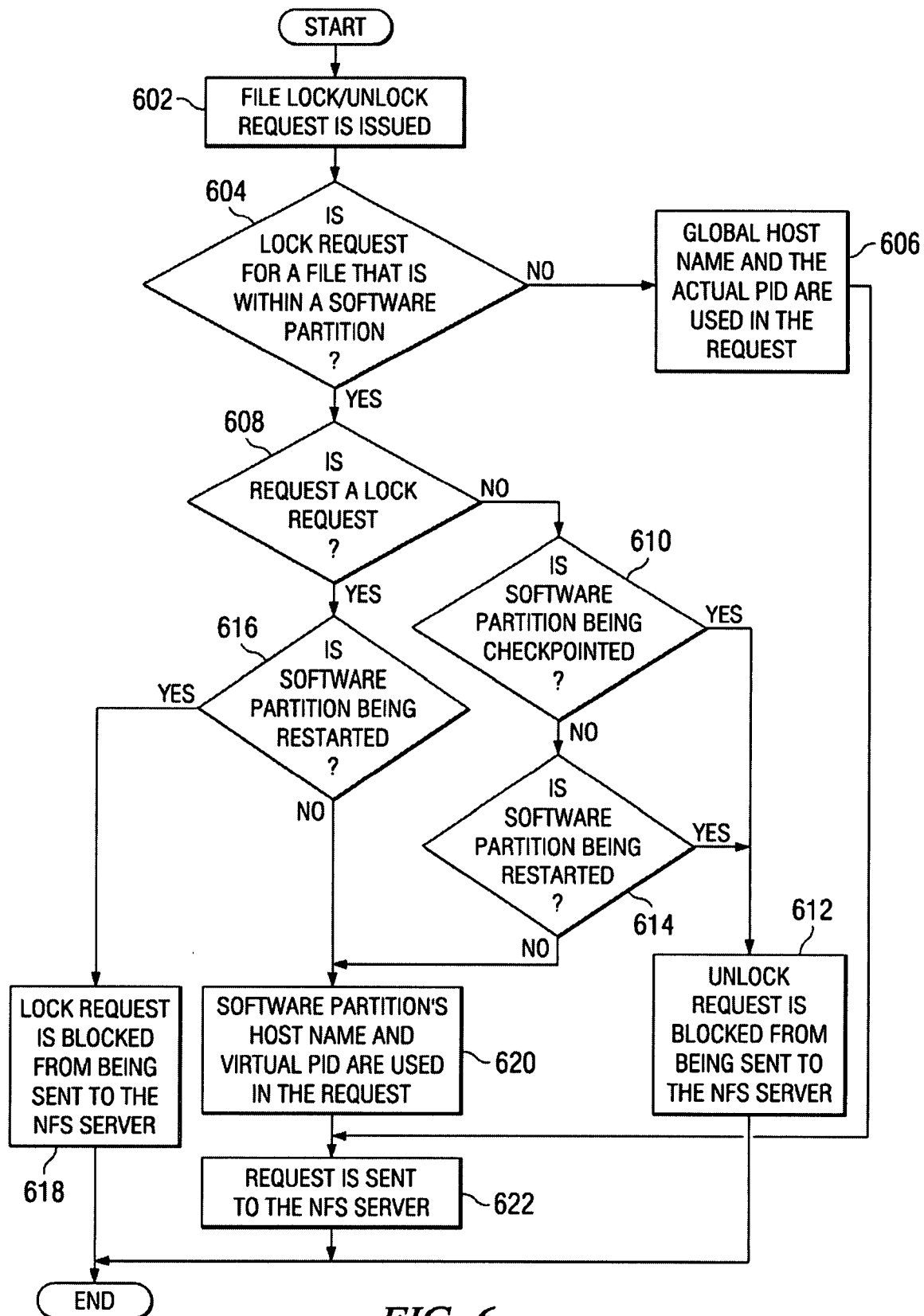
FIG. 6 is a flowchart illustrating the operation of preserving a file lock while moving a software partition from one NFS client data processing system to another NFS client data processing system, in accordance with an exemplary embodiment.

FIG. 6 is a flowchart illustrating the operation of preserving a file lock while moving a software partition from one NFS client data processing system to another NFS client data processing system, in accordance with an exemplary embodiment. The operation of FIG. 6 may be performed by a data processing system such as origination data processing system 308 or destination data processing system 320 in FIG. 3. Specifically, the operation of FIG. 6 is performed by a WPAR, such as WPAR 310 of FIG. 3. The operation begins when a file lock/unlock request is issued (step 602). The operation determines if the lock/unlock request is for a file that is within a software partition (step 604).

If the lock/unlock request is not for a file within a software partition (a "no" output to step 604), the global host name and the actual pid of the WPAR are used in the lock/unlock request (step 606). The lock/unlock request is sent to the NFS server (step 622) and the operation ends. If the lock/unlock request is for a file within a software partition (a "yes" output to step 604), the operation determines if the lock/unlock request is a lock request (step 608). If the operation determines that the lock/unlock request is not a lock request, and is therefore an unlock request (a "no" output to step 608), the operation determines if the software partition is being checkpointed (step 610). If the software partition is being checkpointed (a "yes" output to step 610), the unlock request is blocked from being sent to the NFS server (step 612) and the process ends.

If the software partition is not being checkpointed (a "no" output to step 610), the operation determines if the software partition is being restarted (step 614). If the software partition is being restarted (a "yes" output to step 614), the unlock request is blocked from being sent to the NFS server (step 612) and the process ends.

If the software partition is not being restarted (a "no" output to step 614), the software partition's host name and virtual pid are used in the request (step 620). The request is sent to the NFS server (step 622) and the operation ends. If the operation determines that the request is a lock request (a "yes" output to step 608), the operation determines if the software partition is being restarted (step 616). If the software partition is being restarted (a "yes" output to step 616), the lock request is blocked from being sent to the NFS server (step 618) and the process end.

If the software partition is not being restarted (a "no" output to step 616), then the software partition's host name and virtual pid are used in the lock request (step 620). The lock request is sent to the NFS server (step 622) and the operation ends.

Thus, exemplary embodiments provide a computer implemented method, apparatus, and computer-usable program code for moving a software partition from one NFS client data processing system to another NFS client data processing system, and for preserving file locks while moving a software partition from one NFS client data processing system to another NFS client data processing system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The computer readable storage medium can be an electronic, magnetic, optical, electromagnetic, infrared, or semiconductor system, apparatus, or device Examples of a computer-readable storage medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for preserving file locks while moving a software partition, the computer implemented method comprising:
   creating a checkpoint for the software partition;
   responsive to creating the checkpoint, moving the origination network file system client data processing system to a destination network file system client data processing system;
   restarting the software partition on the destination network file system client data processing system;
   receiving a request for a file;
   determining whether the request is for a file that is within the software partition and stored on a remote network file system server;
   responsive to a determination that the request is for a file within the software partition and stored on the remote network file system server, determining, using a processor unit, whether the request is a lock request;
   responsive to a determination that the request is a lock request, determining whether the software partition is being restarted, wherein the lock request is a replayed lock request requesting to reacquire a lock on a restart of the software partition; and
   responsive to a determination that the software partition is being restarted, blocking the lock request from being sent to the remote network file system server.

2. The computer implemented method of claim 1, further comprising:
   responsive to a determination that the software partition is not being restarted, using a host name of the software partition and a virtual process identifier of the software partition in the request; and
   sending the request to the remote network file system server.

3. The computer implemented method of claim 1, wherein blocking the lock request from being sent to the remote network file system server further comprises:
   blocking all lock requests for files within the software partition from being sent to the remote network file system server until all of a plurality of processes in the software partition have been unfrozen to prevent a restart notification from reaching a status monitor running on the remote network file system server.

4. The computer implemented method of claim 1, further comprising:
   responsive to a determination that the request is not a lock request and that the request is therefore an unlock request, determining whether the software partition is being checkpointed; and
   responsive to a determination that the software partition is being checkpointed, freezing a plurality of processes in the software partition and blocking all unlock requests from the plurality of processes from being sent to the remote network file system server.

5. The computer implemented method of claim 4, further comprising:
   responsive to a determination that the software partition is not being checkpointed, determining whether the software partition is being restarted.

6. The computer implemented method of claim 5, further comprising:
   responsive to a determination that the software partition is not being restarted, using a host name of the software partition and a virtual process identifier of the software partition in the request; and
   sending the request to the remote network file system server.

7. The computer implemented method of claim 5, further comprising:
   responsive to a determination that the software partition is being restarted, blocking the unlock request from being sent to the remote network file system server.

8. A computer program product for preserving file locks while moving a software partition, the computer program product comprising:
   a computer readable storage device having computer readable program code for preserving file locks while moving a software partition, the computer readable program code comprising:
   computer readable program code configured to create a checkpoint for the software partition;
   computer readable program code configured to move, responsive to creating the checkpoint, the origination network file system client data processing system to a destination network file system client data processing system;
   computer readable program code configured to restart the software partition on the destination network file system client data processing system;
   computer readable program code configured to receive a request for a file;
   computer readable program code configured to determine whether the request is for a file that is within a software partition and stored on a remote network file system server;
   computer readable program code configured to determine, responsive to a determination that the request is for a file within the software partition and stored on the remote network file system server, whether the request is a lock request;
   computer readable program code configured to determine, responsive to a determination that the request is a lock request, whether the software partition is being restarted, wherein the lock request is a replayed lock request requesting to reacquire a lock on a restart of the software partition; and
   computer readable program code configured to block, responsive to a determination that the software partition is being restarted, the lock request from being sent to the remote network file system server.

9. The computer program product of claim 8, further comprising:
   computer readable program code configured to determine, responsive to a determination that the request is not a lock request and that the request is therefore an unlock request, whether the software partition is being checkpointed; and
   computer readable program code configured to freeze, responsive to a determination that the software partition is being checkpointed, a plurality of processes in the software partition and block all unlock requests from the plurality of processes from being sent to the remote network file system server.

10. The computer program product of claim 9, further comprising:
    computer readable program code configured to determine, responsive to a determination that the software partition is not being checkpointed, whether the software partition is being restarted; and
    computer readable program code configured to block, responsive to a determination that the software partition is being restarted, the unlock request from being sent to the remote network file system server.

11. The computer program product of claim 8, wherein the computer readable program code configured to block the lock request from being sent to the remote network file system server further comprises:
computer readable program code configured to block all lock requests for files within the software partition from being sent to the remote network file system server until all of a plurality of processes in the software partition have been unfrozen to prevent a restart notification from reaching a status monitor running on the remote network file system server.

12. A data processing system for preserving file locks while moving a software partition, the data processing system comprising:
a bus;
a communications unit connected to the bus;
a storage device connected to the bus, wherein the storage device includes computer-usable program code; and
a processor unit connected to the bus, wherein the processor unit is configured to execute the computer-usable program code to create a checkpoint for the software partition, responsive to creating the checkpoint, move the origination network file system client data processing system to a destination network file system client data processing system restart the software partition on the destination network file system client data processing system, receive a request for a file; determine whether the request is for a file that is within a software partition and stored on a remote network file system server; responsive to a determination that the request is for a file within the software partition and stored on the remote network file system server, determine whether the request is a lock request; responsive to a determination that the request is a lock request, determine whether the software partition is being restarted, wherein the lock request is a replayed lock request requesting to reacquire a lock on a restart of the software partition; and responsive to a determination that the software partition is being restarted, block the lock request from being sent to the remote network file system server.

13. The data processing system of claim 12, wherein the processor unit is further configured to execute the computer-usable program code, responsive to a determination that the software partition is not being restarted, to use a host name of the software partition and a virtual process identifier of the software partition in the request; and send the request to a remote network file system server.

14. The data processing system of claim 13, wherein in executing the computer-usable program code to block the lock request from being sent to the remote network file system server the processor unit is further configured to execute the computer-usable program code to block all lock requests for files within the software partition from being sent to the remote network file system server until all of a plurality of processes in the software partition have been unfrozen to prevent a restart notification from reaching a status monitor running on the remote network file system server.

15. The data processing system of claim 12, wherein the processor unit is further configured to execute the computer-usable program code, responsive to a determination that the request is not a lock request and that the request is therefore an unlock request, to determine whether the software partition is being checkpointed; and responsive to a determination that the software partition is being checkpointed, to freeze a plurality of processes in the software partition and block all unlock requests from the plurality of processes from being sent to the remote network file system server.

16. The data processing system of claim 15, wherein the processor unit is further configured to execute the computer-usable program code, responsive to a determination that the software partition is not being checkpointed, to determine whether the software partition is being restarted; responsive to a determination that the software partition is not being restarted, use a host name of the software partition and a virtual process identifier of the software partition in the request; and send the request to the remote network file system server.

17. The data processing system of claim 15, wherein the processor unit is further configured to execute the computer-usable program code, responsive to a determination that the software partition is not being checkpointed, to determine whether the software partition is being restarted; and, responsive to a determination that the software partition is being restarted, to block the unlock request from being sent to the remote network file system server.

18. A system for preserving file locks while moving a software partition, the system comprising:
a network file system server;
an origination network file system client data processing system configured to create a checkpoint for the software partition, wherein a file system for the software partition resides on the network file system server, wherein the software partition is moved from the origination network file system client data processing system to a destination network file system client data processing system;
the destination network file system client data processing system comprising a processor unit, wherein the destination network file system client data processing system is configured to receive the software partition from the origination network file system client data processing system in response to the checkpoint being created; restart the software partition on the destination network file system client data processing system; receive a request for a file; determine whether the request is for a file that is within the file system for the software partition; responsive to a determination that the request is for a file within the file system for the software partition, determine whether the request is a lock request; responsive to a determination that the request is a lock request, determine whether the software partition is being restarted, wherein the lock request is a replayed lock request requesting to reacquire a lock on a restart of the software partition; and responsive to a determination that the software partition is being restarted, block the lock request from being sent to the network file system server.

19. The system of claim 18, wherein the origination network file system client data processing system is configured to, responsive to a determination that the request is not a lock request and that the request is therefore an unlock request, determine whether the software partition is being checkpointed; and responsive to a determination that the software partition is being checkpointed, freeze a plurality of processes in the software partition and block all unlock requests from the plurality of processes from being sent to the remote network file system server.

20. The system of claim 19, wherein the destination network file system client data processing system is further configured to, responsive to a determination that the software partition is not being checkpointed, determine whether the software partition is being restarted; and responsive to a determination that the software partition is being restarted, block the unlock request from being sent to the remote network file system server, wherein in blocking the lock request from being sent to the network file system server the destination network file system is further configured to block all lock requests for files within the software partition from being sent to the remote network file system server until all of a plurality of processes in the software partition have been unfrozen to prevent a restart notification from reaching a status monitor running on the network file system server.

* * * * *